(12) United States Patent
Hoff et al.

(10) Patent No.: US 7,422,486 B2
(45) Date of Patent: Sep. 9, 2008

(54) CONNECTORS TO CONNECT MODULES TO ELECTRONIC DEVICES

(75) Inventors: Greg M. Hoff, Fort Wayne, IN (US); Dan Leeuw, Fort Wayne, IN (US); Ed Poorman, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/617,786

(22) Filed: Dec. 29, 2006

(65) Prior Publication Data

US 2008/0076292 A1    Mar. 27, 2008

Related U.S. Application Data

(60) Provisional application No. 60/846,364, filed on Sep. 22, 2006.

(51) Int. Cl.
*H01R 24/00* (2006.01)
(52) U.S. Cl. .................... 439/660; 439/680; 439/682; 439/655; 439/692
(58) Field of Classification Search ................ 439/579, 439/598, 608, 639, 651, 655, 660, 677, 680, 439/681, 682, 692, 578
See application file for complete search history.

(56) References Cited

U.S. PATENT DOCUMENTS

| | | | | |
|---|---|---|---|---|
| 3,953,099 A | * | 4/1976 | Wilson | 439/205 |
| 4,232,930 A | * | 11/1980 | Teti | 439/680 |
| 4,245,875 A | * | 1/1981 | Shaffer et al. | 439/144 |
| 4,340,265 A | * | 7/1982 | Ott et al. | 439/579 |
| 4,929,184 A | * | 5/1990 | Emadi et al. | 439/681 |
| 5,709,560 A | * | 1/1998 | Hio | 439/157 |
| 6,250,961 B1 | * | 6/2001 | Boiret et al. | 439/587 |

* cited by examiner

*Primary Examiner*—Tho D Ta
(74) *Attorney, Agent, or Firm*—Edell, Shapiro & Finnan, LLC

(57) ABSTRACT

A connector is provided that facilitates an electrical connection between an electronic device and another device. The connector includes a base, a hollow sheath extending from the base, and a plurality of electrical connecting elements disposed and extending longitudinally within the sheath. The plurality of electrical connecting elements includes a first set of electrical connecting elements and a second set of electrical connecting elements, where the electrical connecting elements of the second set have a transverse cross-sectional dimension that is greater than the transverse cross-sectional dimension of electrical connecting elements of the first set.

26 Claims, 6 Drawing Sheets

CONNECTORS TO CONNECT MODULES TO ELECTRONIC DEVICES

CROSS REFERENCE TO RELATED APPLICATIONS

This application claims priority under 35 U.S.C. §119(e) from U.S. Provisional Patent Application Ser. No. 60/846,364, filed Sep. 22, 2006, and entitled "Expansion Module for Enhancing Operation of a Legacy Communication Device," the entire contents of which are hereby incorporated by reference.

FIELD OF THE INVENTION

The invention relates to connectors that facilitate electrical connections between modules and electronic devices.

BACKGROUND

The current approach for communication system expansion for U.S. military communications systems is to replace existing or legacy communication equipment with an entire new system. This is typically due to legacy equipment having been designed and optimized to support a single method of communicating (called a waveform), such that it becomes impractical to modify such legacy equipment to support other communication techniques. Historically, the designs of the legacy equipment have been primarily implemented with hardware circuitry that cannot be modified once the equipment has been fielded. Some portions of the designs have been implemented with microprocessors running software applications designed uniquely for the particular equipment.

With the adoption of software defined radios and the Government's Software Communication Architecture, those limitations will no longer constrain system upgrades. However, realization of that benefit necessitates the procurement and fielding of communication systems that employ these new approaches. These new systems are under development but are projected to be fielded at a significant weight, power usage, size, and cost.

Because legacy communication equipment is designed for specific waveform operation, adding new capabilities requires redesign and replacement of the original radio. Typically, the new capabilities are so different from the original that significant modifications to the supporting platform are also required, resulting in a cost that can be larger than the replacement radio. These platform modifications can include additional voice intercommunications system connection, additional platform DC power conditioning (or duplication of the power conditioning in the replacement radio), replacement radio shock isolation/mounting tray unit, and others. Installation of the replacement system, with the necessary platform modifications, requires the platform served by the communication system be taken out of service and returned to a depot maintenance facility for the work to be performed.

This has led to developmental efforts in providing an expansion module that can be assembled and secured with the existing communication system in the field such that the expansion module communicates with and provides such additional capabilities to the communication system without the requirement of replacing the system altogether. An expansion module that can be fastened to the existing communication system in a side-by-side arrangement has been described in copending U.S. patent application Ser. No. 11/617,778, filed Dec. 29, 2006, the disclosure of which is incorporated herein by reference in its entirety.

However, one problem associated with connecting the expansion module with the existing communication system, particularly when the communication system remains installed with a support structure (e.g., installed in a mobile vehicle), is that the connection port for the communication system is at a location on the system that may be difficult to reach or may be in a small or tight space that renders it difficult for connecting with any other device. In addition, the further capabilities to be provided to the communication system may require mating connectors that can accommodate a variety of different types of signals and/or the ability to transfer electrical power over the connectors.

SUMMARY

In accordance with the present invention, a connector is provided that facilitates an electrical connection between an electronic device and another device. The connector comprises a base, a hollow housing or sheath extending from the base, and a plurality of electrical connecting elements disposed and extending longitudinally within the sheath. The plurality of electrical connecting elements includes a first set of electrical connecting elements and a second set of electrical connecting elements, where the electrical connecting elements of the second set have a transverse cross-sectional dimension that is greater than the transverse cross-sectional dimension of electrical connecting elements of the first set.

In a preferred embodiment, the base includes a front surface with an annular recess defined within the front surface and extending around the sheath such that a portion of the sheath extends into the front surface of the base. In addition, the annular recess, sheath and electrical connecting elements of the connector are suitably dimensioned so as to facilitate mating and electrical connection with a second connector such that a portion of a housing or sheath of the second connector is received within the annular recess and electrical connecting elements disposed within the sheath of the second connector mate and electrically engage with corresponding electrical connecting elements of the connector.

In accordance with another embodiment of the invention, a method is provided for connecting a first connector with a second connector. The first connector comprises a base plate and a housing or sheath extending from the base plate, the sheath of the first connector including a first set of contact pins and a second set of contact pins disposed within and extending in a longitudinal dimension of the sheath, and the second set of contact pins have a transverse cross-sectional dimension that is greater than a transverse cross-sectional dimension of the contact pins of the first set. The second connector comprises a base plate and a housing or sheath extending from the base plate, the sheath of the second connector including a first set of sockets and a second set of sockets disposed within and extending in a longitudinal dimension of the sheath, and the second set of sockets have a transverse cross-sectional dimension that is greater than a transverse cross-sectional dimension of the sockets of the first set. The method comprises mating the first connector with the second connector such that each contact pin is received within and is electrically coupled with a corresponding socket.

The connector of the present invention includes a number of useful features including, without limitation, a smaller dimension or "low profile" in comparison to conventional connectors, where the annular recess defined in the base around the sheath receives at least a portion of the mating sheath of another connector. This reduces the dimension defined in the longitudinal dimension of the mated connectors, and thus facilitates connection of the connectors in small or tight spaces.

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

Figure 1:
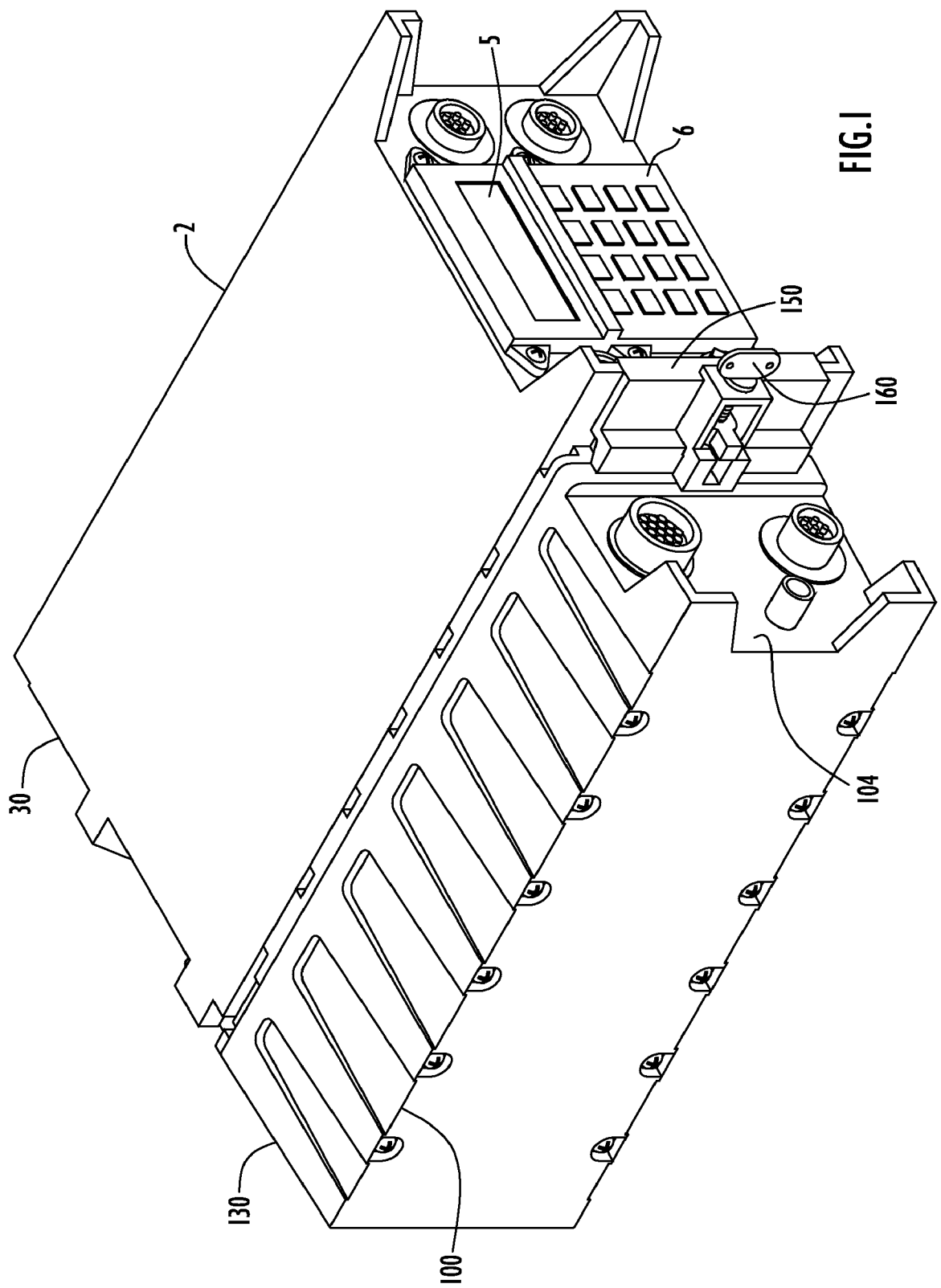
FIG. 1 is a view in perspective of an exemplary embodiment of an expansion or sidehat module secured to a SINCGARS radio in accordance with the present invention.

In accordance with the present invention, electrical connectors are provided that facilitate electrical connections between an existing electronic device and one or more modules or devices that connect with the electronic device. In particular, a connection port for an electronic module is provided that is relatively small in dimension and includes a small or low profile to facilitate easy assembly and connection of the connection port with a corresponding connection port of an existing electronic unit or device when the device is mounted to a structure. The corresponding connection port of the existing electronic unit is further designed, in accordance with the invention, to facilitate connection with two or more different modules, cables and/or any other types of devices that permit exchange of analog signals (e.g., audio or radio signals), digital signals (e.g., communication and/or control signals) and/or the transfer of electrical power between the existing electronic unit and the device to which the unit is electrically connected.

In an exemplary embodiment, a connection port is integrated with an expansion module, also referred to as a "sidehat module", to facilitate an electrical connection of the sidehat module with an existing communication unit including a corresponding connection port, where the electrical connection is achieved when the sidehat module is secured alongside the communication unit.

In particular, connectors or connection ports are described herein with one connection port being integrated with an expansion module that provides the addition of a communications channel, via the expansion module, to existing or legacy communication systems employing Single Channel Ground and Airborne Radio System Advanced SINCGARS Improvement Program-Enhanced (SINCGARS ASIP-E) radios while utilizing the existing platform interfaces.

The expansion module is configured to mount to a conventional SINCGARS radio, within a conventional shock isolation mount (e.g., a mount disposed within a military vehicle), where the expansion module shares the conditioned DC power source used by the SINCGARS radio. In addition, the expansion module includes suitable hardware and electronic circuitry that facilitates communication with the SINCGARS radio, upon connection of the module connection port with a corresponding connector or connection port of the radio, and the expansion module shares the platform voice intercommunications connection used by the SINCGARS radio. Thus, the connection ports of the expansion module and radio are designed to facilitate transfer of analog signals (e.g., radio and/or audio signals), digital signals (e.g., control and/or communication signals), and electrical power between the radio and module via their connection ports.

However, it is noted that the connectors or connection ports of the invention are not limited to the exemplary embodiment described below and depicted in the figures, but rather can be integrated with any number of electronic devices requiring connection with other electronic devices having complementary connection ports.

An exemplary embodiment of connectors that facilitate an electrical connection between an expansion or sidehat module and a radio is depicted in FIGS. 1-6. The sidehat module of FIGS. 1-3 connects with a SINCGARS RT-1523F radio. In particular, the sidehat module mechanically fastens or connects to the radio in a side-by-side relationship, as depicted in FIG. 1, using suitable connection equipment. When the sidehat module is connected with the radio in this manner, the connection port of the sidehat module is also connected with a complementary connection port of the radio to facilitate electrical connection and communication between the two components.

Referring to FIG. 1, a generally rectangular expansion or sidehat module 100 is connected alongside a generally rectangular SINCGARS RT-1523F radio 2. Radio 2 includes a front panel 4 that includes a suitable electronic display 5 and a user input interface including a touch key pad 6 that includes input keys to facilitate control and operability of the radio by a user, as well as a power and control switch and various data ports configured to connect with other components for exchanging data. Sidehat module 100 also includes a front panel 104 that includes various data ports to connect with other components for exchanging data. The radio and sidehat module connect with each other such that corresponding sidewalls 10, 110 of these two components engage with each other.

The sidehat module connects with the radio using a securing structure in the form of a clamp 150 and thumbscrew 160 that secure to the front ends of the structure. An exemplary manner in which the sidehat module can be mechanically secured to the radio is described in detail in U.S. patent application Ser. No. 11/617,778.

Figure 2:
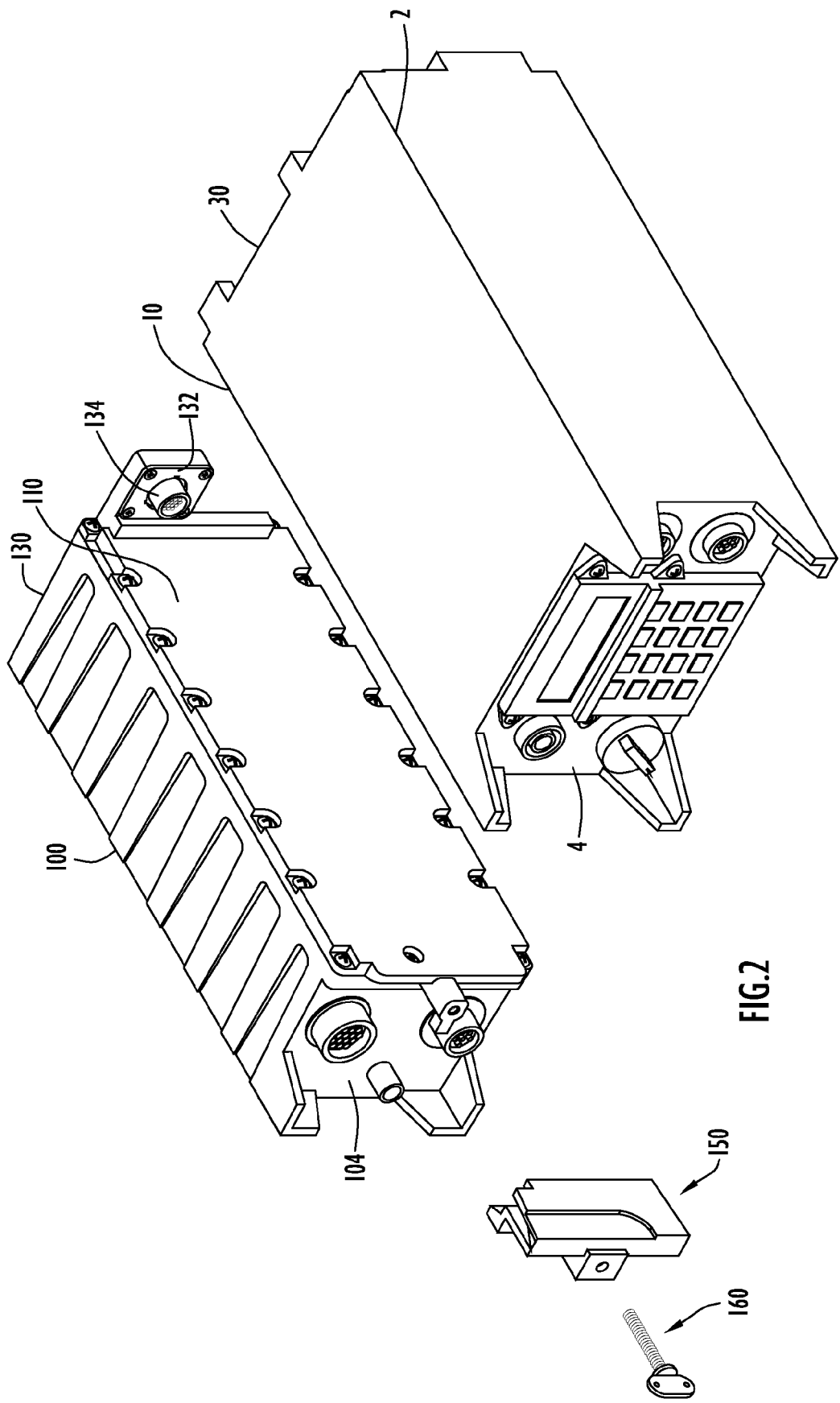
FIG. 2 is a view in perspective of the sidehat module of FIG. 1, including a view of the connector that facilitates connection with a corresponding connector of the radio.

Referring to FIG. 2, sidehat module 100 includes a mounting plate 132 extending transversely from sidewall 110 of the module at a rear and upper location of the module such that a rear surface of the mounting plate is generally coplanar with a rear panel 130 of the module. A data connector or connection port 134 is disposed on and extends from a front surface of mounting plate 132 in a direction toward the front panel 104 of the module.

Figure 3:
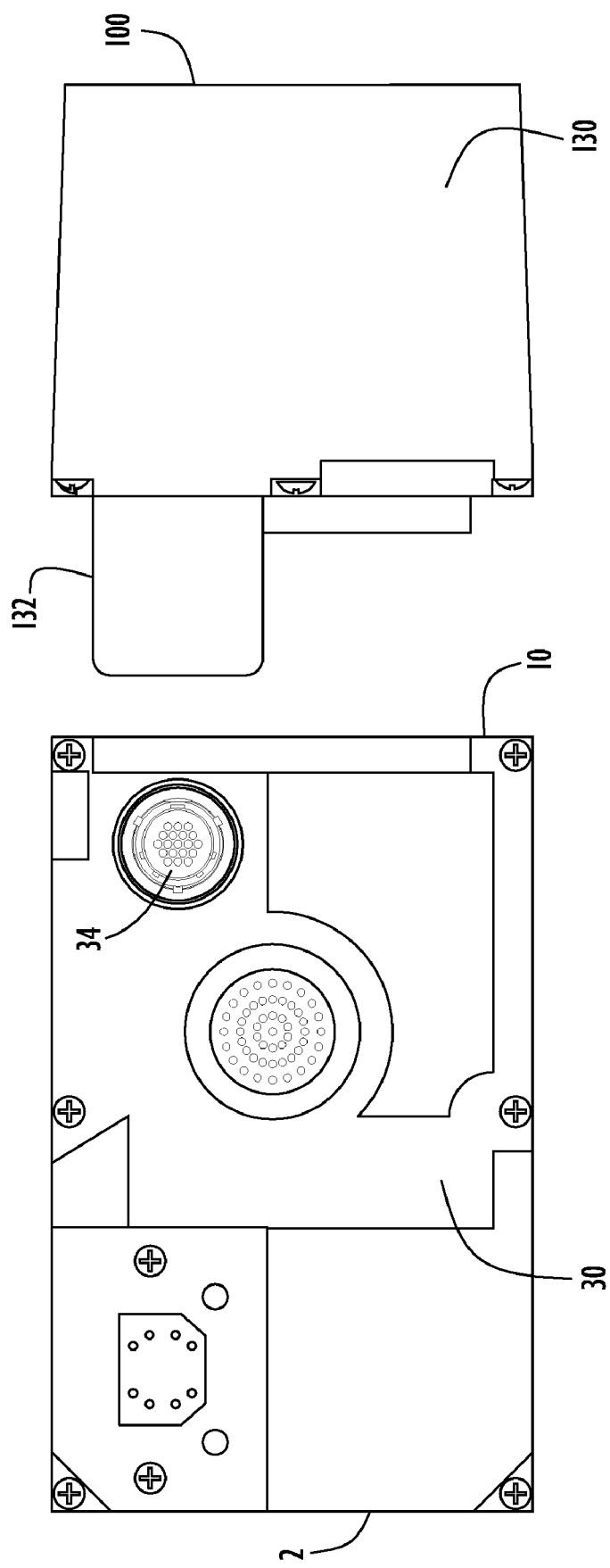
FIG. 3 is a rear view of the radio of FIG. 1, including a view of the connector of the radio.

As can be seen in FIG. 3, radio 2 includes a rear panel 30 with a data connector or connection port 34 disposed at an upper location on the rear panel 30 and near sidewall 10. Connection port 34 is configured to mate and electrically connect with connector 134 of the module in the manner described below.

Figure 4:
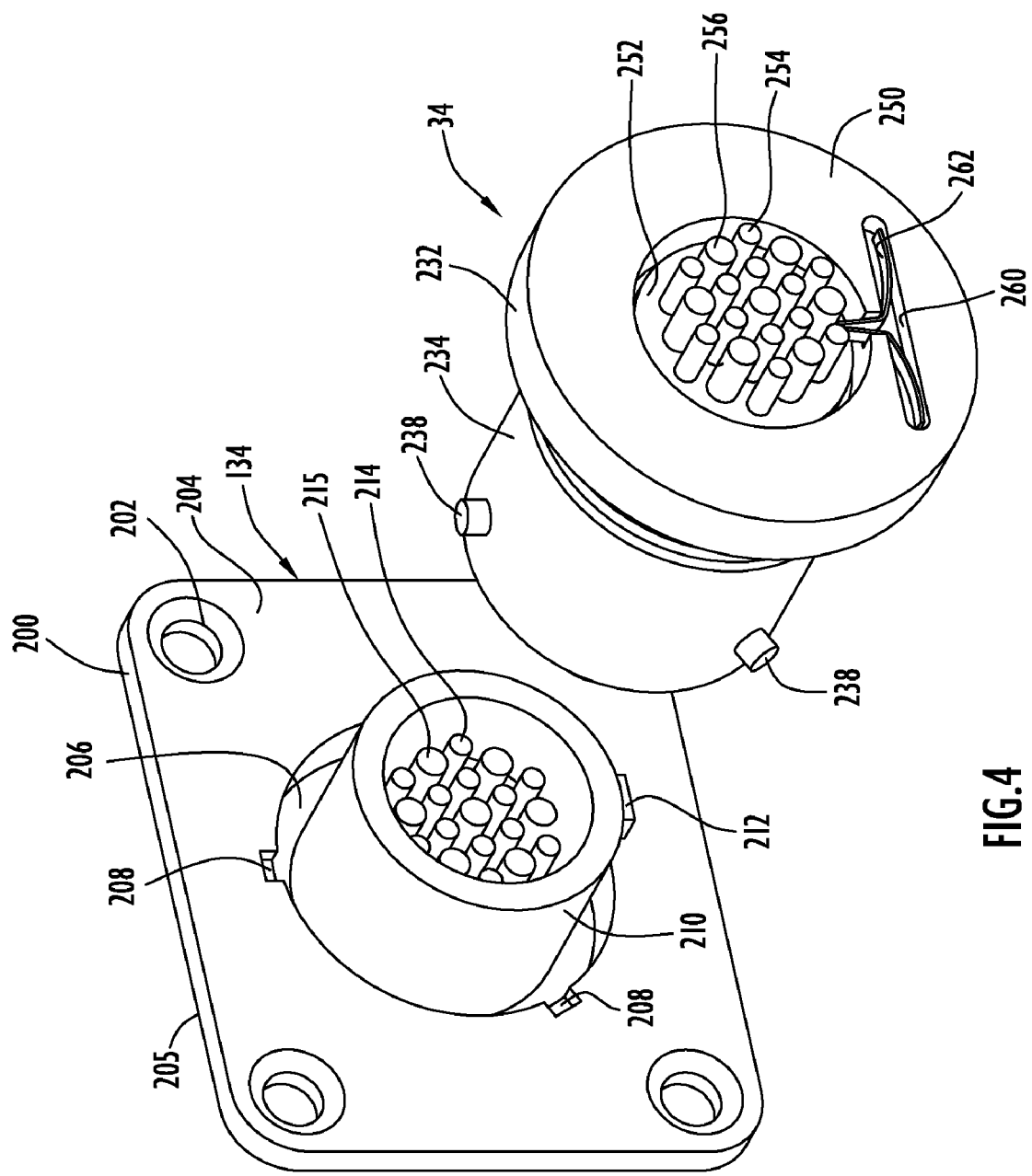
FIG. 4 is a perspective view of the connectors of the module and the radio in isolation and separated from their respective components, including a front view of the module connector.
Figure 5:
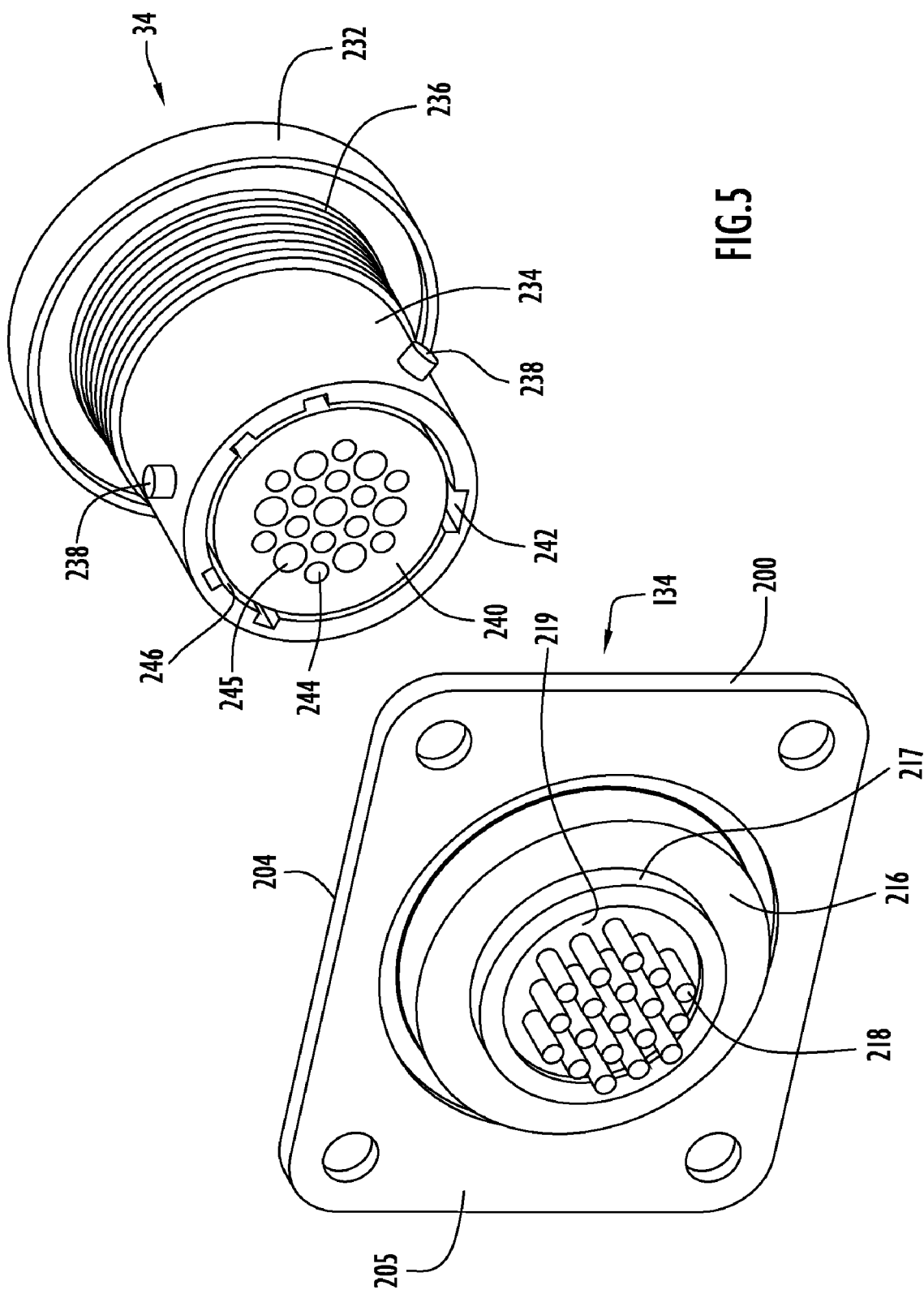
FIG. 5 is a perspective view of the connectors of the module and the radio in isolation and separated from their respective components, including a rear view of the module connector.
Figure 6:
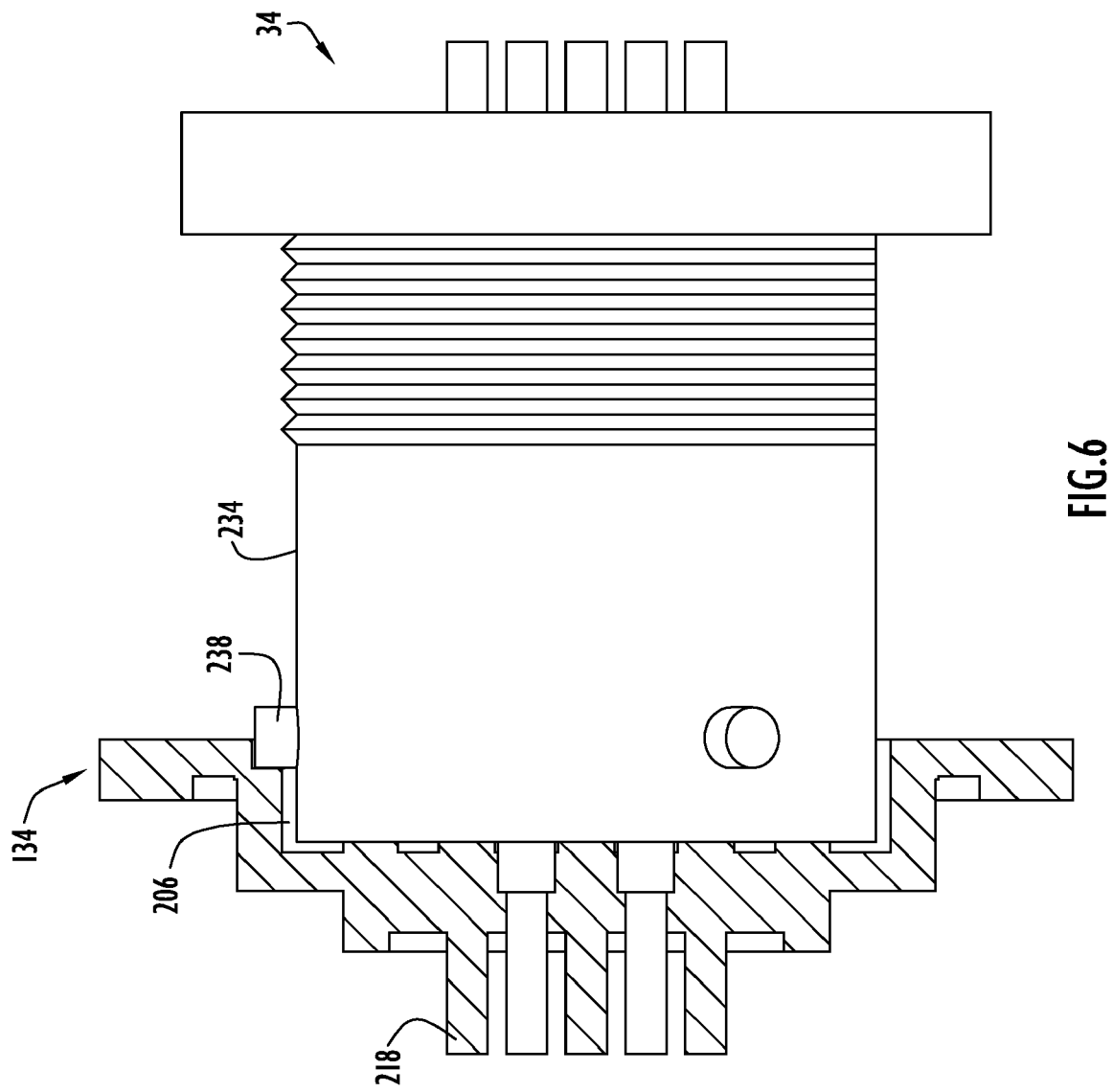
FIG. 6 is a side view in elevation of the connectors of the module and radio mated with each other, with the module connector in cross-section.

Isolated views of connectors 134, 34 of the module and the radio are shown in FIGS. 4-6. Referring to FIGS. 4 and 5, connector 134 of module 100 includes a generally rectangular flange or plate 200 with beveled openings or countersinks 202 at the corners of the flange that are configured to receive fasteners (e.g., screws), where the fasteners secure the flange to mounting plate 132 (as shown in FIG. 2). The countersinks further facilitate proper alignment of the connector flange with the mounting plate, which in turn facilitates proper alignment of module connector 134 with radio connector 34 during mating of the two connectors as the module is connected with the radio.

A front surface 204 of plate 200 is substantially smooth and planar, with a generally circular depression or recess disposed at a central location of the front surface. Plate 200 further includes a rear surface 205 that is substantially smooth and planar, with a generally cylindrical and hollow member 216 extending at a central location of the plate in a substantially perpendicular direction from the plate rear surface. The cylindrical member includes a reduced diameter section 217 that extends to an open end of member 216, thus forming a step along member 216. The open recess formed within the front surface 204 of plate 200 extends to or beyond the planar rear surface 205 and within cylindrical member 216 to the step, where an end wall of the recess is defined at the transition from member 216 to reduced diameter section 217.

Extending from the end wall of the recess in a direction substantially perpendicular to front plate 204 is a generally cylindrical and hollow housing, shroud or sheath 210. The sheath 210 is smaller in transverse cross-sectional dimension or diameter than the dimension of the recess, such that an annular recess 206 is defined between external wall portions of the sheath 212 and wall portions of the plate 200 that form the recess. In addition, the hollow sheath 210 communicates with hollow member 216 disposed on the plate rear surface.

A series of three generally rectangular cut-out sections or grooves 208 are defined along the plate front surface 204 at locations tangent the perimeter of the annular recess 206. The grooves 208 are spaced at angular distances of about 120° from each other along the circular perimeter of annular recess 206, and each groove extends a sufficient depth from the plate front surface so as to receive and engage with a corresponding bayonet pin 238 disposed on a hollow housing, shroud or sheath 234 of radio connection port 34 (as described below) when the radio connection port mates with the module connection port. In addition, sheath 210 includes a generally rectangular protrusion or key 212 that extends transversely from an outer wall surface near the terminal end of the sheath. The key 212 is suitably dimensioned to be received within and engage with a corresponding groove or keyway 242 disposed on in internal wall surface of the radio connection port sheath 234 (as described below) when the radio connection port mates with the module connection port. As described below, the key 212 and keyway 242 serve as keys that appropriately align the two connectors or connection ports with respect to each other so as to permit mating of the connectors.

A plurality of contact pins 214, 215 are disposed at suitably spaced distances from each other and extend within sheath 210. The contact pins 214, 215 extend in a longitudinal direction of the sheath that is substantially perpendicular with the plate 200, where the pins remain within and terminate at a location proximate the terminal end of sheath 210. The contact pins are constructed of a suitable electrically conductive material (e.g., one or more of aluminum, copper, gold, etc.) and are suitably spaced from each other to facilitate transmission of electrical current through the contact pins.

The contact pins of the connection port have different thickness dimensions that engage or mate with corresponding contact sockets disposed on the radio connection port. In the exemplary embodiment depicted in FIGS. 4 and 5, module connection port 34 includes an arrangement of nineteen contact pins, with a first set of twelve contact pins 214 and a second set of seven contact pins 215. The contact pins of the second set have a greater transverse cross-sectional dimension (e.g., diameter) and thickness in relation to the contact pins of the first set. The contact pins are arranged in a suitable pattern that corresponds with the pattern of sockets disposed on the radio connection port.

In the exemplary embodiment of FIGS. 4 and 5, one of the contact pins 215 of the second set is disposed at a central location in the generally circular contact pin arrangement (i.e., the pattern or "footprint" of contact pins). The remaining six contact pins 215 of the second set are disposed near the outer periphery of the generally circular contact pin arrangement at about the same radial distance from the central contact pin 215, with each contact pin 215 at the periphery being spaced at an angular distance of about 60° from the next closest contact pin 215 near the outer periphery. Thus, the contact pins near the outer periphery of the contact pin arrangement combine to form a hexagonal pattern, where each contact pin is disposed at an intersection of two imaginary lines, and the imaginary lines for the contact pins combine to form a hexagon.

Similarly, six of the contact pins 214 of the first set are disposed at the outer periphery of the contact pin arrangement at the same radial distance from central contact pin 215 and further at angular locations between contact pins 215 near the outer periphery. Each of the contact pins 214 at the outer periphery is spaced at an angular distance of about 60° from the next closest contact pin 214 at the outer periphery. Thus, the contact pins 214 at the outer periphery of the contact pin arrangement combine to form a hexagonal pattern, where each contact pin is disposed at an intersection of two imaginary lines, and the imaginary lines for the contact pins combine to form a hexagon.

The remaining six contact pins 214 of the first set are disposed at a radial distance between the center contact pin 215 and the contact pins 214, 215 of the first and second sets that are disposed at or near the outer periphery of the contact pin arrangement. These contact pins 214 are disposed at substantially the same radial distance from central contact pin 215, where each of the contact pins 214 at this radial location is further spaced at an angular distance of about 60° from the next closest contact pin 214 at this radial location. Thus, the contact pins 214 at this radial location combine to form a hexagonal pattern, where each contact pin is disposed at an intersection of two imaginary lines, and the imaginary lines for the contact pins combine to form a hexagon.

The contact pin arrangement is further defined by rows of contact pins, where each row contains at least one contact pin 214 of the first set and at least one contact pin 215 of the second set. In particular, the connection port 134 can be spatially oriented (e.g., by rotating the connection port with respect to a horizontal plane) in a number of different alignments such that the contact pin arrangement includes five horizontal rows of contact pins that are vertically aligned with respect to each other, where the first or top row includes three contact pins, the second row directly below the first row includes four contact pins, the third or middle row directly below the second row includes five contact pins, the fourth row directly below the third row includes four contact pins, and the fifth or bottom row directly below the fourth row includes three contact pins. Each of the rows with three contact pins includes the following arrangement: contact pin 214/contact pin 215/contact pin 214. Each of the rows of the four contact pins includes the following arrangement: contact pin 215/contact pin 214/contact pin 214/contact pin 215. Finally, the third or middle row of five contact pins includes the following arrangement: contact pin 214/contact pin 214/contact pin 215/contact pin 214/contact pin 214.

However, it is noted that the present invention is not limited to this contact pin configuration or this number of contact pins of each set. For example, the connector can be configured with any selected number and/or types of contact pins (e.g., contact pins having the same thickness, or contact pins having two, three or more different thicknesses). While any selected number and types of contact pins can be provided for the connector, it is preferable that a first set includes more contact pins than a second set of contact pins having greater transverse cross-sectional dimensions or thicknesses than the first set of contact pins.

The larger sized contact pins of the second set facilitate a larger current capacity to be carried over these pins in relation to the contact pins of the first set. However, this larger contact pin size also limits the number of spaced contact pins that can be fit within a contact pin arrangement of a specified area in order to facilitate a suitable connection with a corresponding connection port. The combination and arrangement of the first and second sets of contact pins having different transverse cross-sectional dimensions (e.g., diameters) and thicknesses on the connection port, as described above, maximizes the number of contact pins that can be arranged in a given area of the connector or connection port. This in turn enhances the ability of the connection port to transfer varying types of signals (e.g., analog or digital signals) as well as facilitate electrical power supply through the connection port between two electronic devices.

In an exemplary embodiment, the pin diameters are in the range of about 0.040 inches±0.0001 inches (1.016±0.0254 millimeters) and about 0.0300±0.0005 inches (0.762±0.0127 millimeters). The dimensions of the sockets of a corresponding connector are similar with suitable tolerances to facilitate appropriate mating of the contact pins in the sockets. However, it is noted that the sockets and pins may have any other suitable dimensions, depending upon a particular application.

Contact pins 214, 215 extend through plate 204 to connect with corresponding contact pins 218 extending away from the plate rear surface 205. Contact pins 218 are also formed of a suitably electrically conductive material and are oriented in the same spatial arrangement as contact pins 214, 215, with each contact pin 218 being substantially collinear with a corresponding contact pin 214, 215. In the exemplary embodiment of FIGS. 4 and 5, contact pins 218 are all of the same transverse cross-sectional dimension or thickness. However, it is noted that the contact pins 218 can also be configured as two sets of contact pins with varying thicknesses (e.g., contact pins 218 can have the same configuration as contact pins 214, 215). Alternatively, it is noted that each of contact pins 214, 215 may extend as a single, continuous pin through the plate 200 so as to extend from the rear surface 205 in the manner depicted in FIG. 5.

Contact pins 218 are secured (e.g., via soldering) to suitable electrical connectors (e.g., wiring, ribbon cable, etc.) disposed within module mounting plate 132 and/or within module 100 to facilitate transmissions of data or electrical power between the radio and the module upon mating of the connection ports 34, 134. A suitable insulating material 219 (e.g., a plastic resin or polymer material) is provided within cylindrical member 216 to secure the contact pins 214, 215, 218 to the connection port 134 in suitable alignment with respect to each other.

Radio connection port 34 includes a generally circular base plate 232 and a generally cylindrical and hollow sheath 234 extending in a generally perpendicular manner from a front surface of the base plate. The sheath 234 includes a threaded section 236 disposed proximate the base plate to facilitate threaded attachment of the connection port 34 to a corresponding socket disposed at the rear panel 30 of the radio 2 so as to connect the connection port with the radio (as shown in FIG. 2).

A series of three generally cylindrical bayonet pins 238 extend transversely from an outer surface portion near the terminal end of sheath 234. The bayonet pins are spaced at radial distances of about 120° from each other along the circular outer perimeter of sheath 234 and are configured to facilitate connection of the connection port 34 with a standard data cable that includes corresponding channels or grooves disposed along a mating sheath of the cable (e.g., where the cable sheath is inserted over and around sheath 234, with the grooves of the cable sheath engaging the bayonet pins 238, and the cable sheath is then rotated or turned a selected angular distance so as to lock the bayonet pins in the cable sheath grooves). In addition, as noted above, the grooves 208 on plate 200 of the module connection port are suitably dimensioned and configured to receive and clear the bayonet pins of the radio connection port.

A generally cylindrical insulating member 240 is disposed and extends within sheath 234 to base plate 232. The insulating member is constructed of a suitable insulating material (e.g., a plastic resin or polymer material) and has a diameter that is less than the inner diameter of sheath 234, such that an annular recess 246 is defined by the gap between the insulating member and sheath. The sheath wall thickness of module connection port 134 and the annular recess 246 are suitably dimensioned such that sheath 210 fits within recess 246 when the module connection port 134 and the radio connection port 34 are mated and electrically connected together.

Sheath 234 of the radio connection port further includes a generally rectangular shaped groove or keyway 242 disposed on in internal wall surface portion near the terminal end of the sheath that is suitably aligned to receive the key 212 on module connection port sheath 210 as noted above. Sheath 234 also includes additional grooves or keyways along interior wall surface portions near the terminal end of the sheath to facilitate mating with other connectors. The grooves or keyways on the sheath are useful in that they provide a "key" for properly aligning another connector or connection port with the radio connection port (e.g., aligning keyway 242 with key 212) so that the contact pins correctly align and mate with corresponding sockets on the radio connection port.

The insulating member 240 includes a plurality of channels or sockets 244, 245 that extend through and in a longitudinal dimension of the insulating member. Each socket 244, 245 includes an electrically conductive portion disposed within the socket that contacts or engages a contact pin of another connector or connection port (including contact pins 214, 215 of the module connection port) to facilitate an electrical connection between radio connection port 34 and the other connector or connection port.

The plurality of sockets disposed in insulating member 240 includes two sets of sockets having different transverse cross-sectional dimensions (e.g., different diameters). The two sets of sockets include a suitable number of sockets that are suitably aligned to correspond with and receive contact pins 214, 215 of module connection port 134. In particular, connection port 34 includes nineteen sockets, with a first set of twelve sockets 244 and a second set of seven sockets 245 that have a transverse cross-sectional dimension that is greater than that of the sockets in the first set.

The sockets 245 of the second set are suitably aligned in the insulating member in an orientation that corresponds with the alignment of contact pins 215 of the second set in the contact pin arrangement of the module connection port as described above. In particular, one of the sockets 245 of the second set is disposed at a central location in the generally circular socket arrangement (i.e., the pattern or "footprint" of sockets). The remaining six sockets 245 of the second set are disposed near the outer periphery of the socket arrangement at about the same radial distance from the central socket 245, with each socket 245 near the outer periphery being spaced at an angular distance of about 60° from the next socket 245 near the outer periphery. Thus, the sockets 245 near the outer periphery of the socket arrangement combine to form a hexagonal pattern, where each socket is disposed at an intersection of two imaginary lines, and the imaginary lines for the sockets combine to form a hexagon.

Similarly, the sockets 244 of the first set are suitably aligned in the insulating member in an orientation that corresponds with the alignment of contact pins 214 of the first set in the contact pin arrangement of the module connection port as described above. In particular, six of the sockets 244 of the first set are disposed at the outer periphery of the socket arrangement at the same radial distance from central socket 245 and further at locations between the sockets 245 near the outer periphery. Each of the sockets 244 at the outer periphery is spaced at an angular distance of about 60° from the next closest socket 244 at the outer periphery. Thus, the sockets 244 at the outer periphery of the socket arrangement combine to form a hexagonal pattern, where each socket is disposed at an intersection of two imaginary lines, and the imaginary lines for the sockets combine to form a hexagon.

The remaining six sockets 244 of the first set are disposed at a radial distance between the center socket 245 and the sockets 244, 245 of the first and second sets that are disposed at or near the outer periphery of the socket arrangement. These sockets 244 are disposed at substantially the same radial distance from central socket 245, where each of the sockets 244 at this radial location is further spaced at an angular distance of about 60° from the next closest socket 244 at this radial location. Thus, the sockets 244 at this radial location combine to form a hexagonal pattern, where each socket is disposed at an intersection of two imaginary lines, and the imaginary lines for the sockets combine to form a hexagon.

The socket arrangement, like the contact pin arrangement, is further defined by rows of sockets, where each row contains at least one socket 244 of the first set and at least one socket 245 of the second set. In particular, the connection port 34 can be spatially oriented (e.g., by rotating the connection port with respect to a horizontal plane) in a number of different alignments such that the socket arrangement includes five horizontal rows of sockets that are vertically aligned with respect to each other, where the first or top row includes three sockets, the second row directly below the first row includes four sockets, the third or middle row directly below the second row includes five sockets, the fourth row directly below the third row includes four sockets, and the fifth or bottom row directly below the fourth row includes three sockets. Each of the rows with three sockets includes the following arrangement: socket 244/socket 245/socket 244. Each of the rows of the four sockets includes the following arrangement: socket 245/socket 244/socket 244/socket 245. Finally, the third or middle row of five sockets includes the following arrangement: socket 244/socket 244/socket 245/socket 244/socket 244.

As with the connection port 134, the socket arrangement on connection port 34 is not limited to the above configuration but, rather, can be of any suitable configuration, with any selected numbers and sizes of sockets that are aligned and configured to mate with an arrangement of contact pins for a corresponding connector. Preferably, the arrangement of sockets includes a larger number of sockets of the first set (i.e., the sockets of smaller transverse cross-sectional dimension) in relation to sockets of the second set.

The socket arrangement thus facilitates mating of each contact pin 214 within a corresponding socket 244 of the first set (i.e., where a contact pin 214 is received within and electrically couples with a socket 244) and mating of each contact pin 215 with a corresponding socket 245 of the second set (i.e., where a contact pin 215 is received within and electrically couples with a socket 245) upon proper alignment of the two connection ports with each other (i.e., proper alignment is achieved when key 212 of module connection port sheath 210 is aligned and mates with keyway 242 of radio connection port sheath 234, and when sheath 210 a sufficient distance within annular recess 246).

The electrically conductive portions of sockets 244, 245 connect with contact pins 254, 256 that extend through a central opening in a generally planar rear surface 250 of base plate 232, where the central opening communicates with sheath 234. Contact pins 254 extend collinearly with and connect with the electrically conductive portions of sockets 244, while contact pins 256 extend collinearly with and connect with the electrically conductive portions of sockets 245. Contact pins 256 further have transverse cross-sectional dimensions that are greater than the transverse cross-sectional dimensions of contact pins 254. Contact pins 254, 256 extend slightly beyond base plate rear surface 250 and are secured (e.g., via soldering) to suitable electrical connectors (e.g., wiring, ribbon cable, etc.) disposed within radio 2 to facilitate transmissions of data or electrical power between the radio and the sidehat module or any other device connected with the radio at this connection port.

An elongated groove 260 is defined in the base plate rear surface that communicates with the base plate opening. In addition, an electrically conductive spring member 262 extends within groove 260 so as to contact an internal wall surface of the base plate (located within the groove) and one of the contact pins 256 extending through the base plate, thus providing an electrical ground between the contact pin and the base plate. It is noted that the grounding design, which grounds a contact pin to the connector base plate or shell, is not limited to this configuration. Rather, any other suitable grounding design can be provided.

The socket arrangement of the radio connection port further facilitates electrical connection of the radio connection port with other connectors or connection ports of other units having different contact pin configurations. For example, connection port 34 is configured to mate with module connection port 134 as noted above. In addition, connection port 34 is further configured to mate with standard data cable connectors, such as cable connectors that include 6 (or fewer) contact pins that are arranged, for example, to mate and electrically connect with the outer peripheral arrangement of six sockets 245 of the radio connection port. Thus, the socket configuration of connection port 34 enhances the functionality and diversity of this connection port for connecting with various different connectors as well as the ability to transfer a variety of different data signals (analog and digital) and also electrical power between the radio and other electronic components connected to the radio via such connection port.

Electrical connection of the radio with sidehat module using connection ports 34, 134 is now described with reference to FIGS. 1-6. The two connection ports are appropriately aligned with each other by aligning key 212 of module connection port sheath 210 with keyway 242 of radio connection port sheath 234. In the embodiment of FIGS. 1-6, the proper alignment is ensured by properly securing connection port 134 in the appropriate alignment with mounting plate 132 of module 100, such that the key 212 and the keyway 242 will be appropriately aligned to facilitate mating of the two connection ports when the module is connected with the radio. The countersinks 202 on plate 200 further facilitate precise alignment of connection port 134 on mounting plate 132 to achieve proper mating or registry of contact pins 214, 215 within sockets 244, 245 of radio connection port 34.

In connecting the two connection ports, a portion of sheath 210 of connection port 134 is received within annular recess 246 of connection port 34. In addition, annular recess 206 of the module connection port plate 200 is suitably dimensioned to receive a portion of the terminal end of sheath 234 of the radio connection port 34 when these two ports are mated together, with bayonet pins 238 being at least partially received within corresponding grooves 208 (as can be seen in FIG. 6). When sheath 210 has been received within annular recess 246, and a terminal end portion of sheath 234 has been sufficiently received within annular recess 206 such that key 212 is mated with keyway 242 and pins 238 are mated with grooves 208, the contact pins 214, 215 have been received a sufficient distance with sockets 244, 245 to contact the electrically conductive portions of the sockets, thus facilitating an electrical connection of the connection ports 34, 134 of the radio and the sidehat module.

As can be seen from FIGS. 4-6 (in particular, FIG. 6), connection port 134 has a small or low profile in a dimension or along an axis in which the contact pins 214, 215 are aligned (i.e., in a longitudinal dimension of sheath 210). In addition, the mating connection ports maintain a low profile in this dimension, since recess 206 receives a portion of the terminal end of the radio connector sheath 234 when the two connection ports are mated with each other. This low profile feature of the connection port 134 is very useful, particularly in scenarios where there is little room or space for connecting a module to an existing electronic device that may be mounted to some structure.

For example, in the embodiment depicted in the figures, a SINCGARS radio unit is typically mounted within a mobile vehicle, with its connection port being located at a rear and unexposed end of the unit (as shown in FIG. 2). There is often only a small space at the rear of the mounted radio unit in which a cable or other device, such as the sidehat module, can be electrically connected to the radio unit via this connection port. The low profile configuration of connection port 134 facilitates an easy connection with the radio unit, since a portion of the connection port sheath 234 of the radio unit is actually received within the recess of the connection port of the sidehat module.

Thus, the connectors or connection ports of the present invention facilitate a wide range of connections between an electronic unit and other modules to connect with the electronic unit. The low profile design of the connectors facilitate mating with other connectors in small or tight spaces, while the number, pattern and combination of different sized electrical connecting elements (e.g., contact pins/sockets) on a connector maximizes the number of electrical connecting elements that can be disposed within a given area of a connector and further expands the range of applications in which the connector can be used for transmitting analog signals (e.g., radio and/or audio signals), digital signals (e.g., control and/or other data signals), and/or providing electrical power from one unit connected to another unit.

Having described exemplary embodiments of connectors to connect modules to existing electronic devices, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A connector for electrically connecting an electronic device to another device, the connector comprising:
   a base plate;
   a hollow sheath extending from the base plate; and
   a plurality of electrical connecting elements disposed within and extending in a longitudinal direction of the sheath, wherein the plurality of electrical connecting elements includes a first set of electrical connecting elements and a second set of electrical connecting elements, the electrical connecting elements of the second set having a transverse cross-sectional dimension that is greater than the transverse cross-sectional dimension of electrical connecting elements of the first set;
   wherein the base plate includes a front surface with an annular recess defined within the front surface and extending around the sheath such that a portion of the sheath extends into the front surface of the base plate.

2. The connector of claim 1, wherein the first set includes more electrical connecting elements than the second set of electrical connecting elements.

3. The connector of claim 1, wherein at least one of the first and second sets includes at least six electrical connecting elements that are arranged in a hexagonal pattern with respect to each other within the sheath.

4. The connector of claim 1, wherein the first set includes twelve electrical connecting elements, and the second set includes seven connecting elements.

5. The connector of claim 1, further comprising:
   rear electrical connecting elements that extend from a rear surface of the base plate, wherein each rear electrical connecting element is electrically coupled to a corresponding electrical connecting element of the first or second set within the connector, and the rear connecting elements are configured to be electrically coupled to electrical contact elements of a device to which the connector is attached.

6. The connector of claim 1, wherein the first and second sets of electrical connecting elements facilitate the transmission of analog signals, digital signals, and electrical power between a first electronic unit to which the connector is attached and a second electronic unit that connects with the first electronic unit via the connector.

7. The connector of claim 1, wherein the sheath and the base plate are connected such that the base plate is not movable with respect to the sheath.

8. The connector of claim 1, wherein the sheath and the base plate are formed as a single, integral unit.

9. The connector of claim 1, wherein the annular recess, sheath and electrical connecting elements of the connector are suitably dimensioned so as to facilitate mating and electrical connection with a second connector such that a portion of a sheath of the second connector is received within the annular recess and electrical connecting elements disposed within the sheath of the second connector mate and electrically engage with corresponding electrical connecting elements of the connector.

10. The connector of claim 9, wherein the sheath of the connector includes a key member configured to align and engage with a corresponding key member disposed on the sheath of the second connector.

11. The connector of claim 1, wherein the electrical connecting elements of the first and second sets comprise electrical contact pins that are configured to mate with corresponding sockets of the second connector.

12. An expansion module configured to connect with a communication device via the connector of claim 11, to facilitate the transmission of at least one of analog signals, digital signals, and electrical power between the communication device and the expansion module.

13. The expansion module of claim 12, wherein the connector is disposed on a mounting plate near an end of the expansion module.

14. A connector for electrically connecting an electronic device to another device, the connector comprising:
   a base;
   a hollow sheath extending from the base; and
   a plurality of electrical connecting elements disposed within and extending in a longitudinal direction of the sheath, wherein the plurality of electrical connecting elements includes a first set of electrical connecting elements and a second set of electrical connecting elements, the electrical connecting elements of the second set having a transverse cross-sectional dimension that is greater than the transverse cross-sectional dimension of electrical connecting elements of the first set;
   wherein the electrical connecting elements of the first and second sets comprise sockets formed within a material disposed within and separated from the sheath such that a gap is defined between the material and the sheath, and the sockets are configured to mate with corresponding contact pins of a second connector.

15. The connector of claim 14, wherein the number and alignment of sockets of the first and second sets within the sheath facilitates connection of the connector with at least two different types of connectors including at least one of a different arrangement of contact pins and a different number of contact pins.

16. The connector of claim 14, wherein the sheath and the base plate are connected such that the base plate is not movable with respect to the sheath.

17. The connector of claim 14, wherein the material in which the sockets are formed comprises a single structure.

18. The connector of claim 14, wherein the gap comprises an annular recess defined between the material and the sheath, and the annular recess is suitably dimensioned to receive a portion of a sheath of the second connector that contains the corresponding contact pins.

19. The connector of claim 18, wherein the sheath of the connector includes a key member configured to align and engage with a corresponding key member disposed on the sheath of the second connector.

20. A communication device configured to connect with an expansion module, via the connector of claim 14, to facilitate the transmission of at least one of analog signals, digital signals, and electrical power between the communication device and the expansion module.

21. The communication device of claim 20, wherein the connector is disposed at an end of the communication device.

22. A method of connecting a first connector with a second connector, wherein the first connector comprises a base plate and a sheath extending from the base plate, the sheath of the first connector including a first set of contact pins and a second set of contact pins disposed within and extending in a longitudinal dimension of the sheath, the second set of contact pins having a transverse cross-sectional dimension that is greater than a transverse cross-sectional dimension of the contact pins of the first set, and the second connector comprises a base plate and a sheath extending from the base plate, the sheath of the second connector including a first set of sockets and a second set of sockets disposed within and extending in a longitudinal dimension of the sheath, the second set of sockets having a transverse cross-sectional dimension that is greater than a transverse cross-sectional dimension of the sockets of the first set, the method comprising:
   mating the first connector with the second connector such that each contact pin is received within and is electrically coupled with a corresponding socket;
   wherein, upon mating of the first connector with the second connector, a portion of the sheath of the first connector is received within an annular recess defined between an arrangement of the sockets and internal wall surface portions of the sheath of the second connector, and a portion of the sheath of the second connector is received within an annular recess defined in the base plate of the first connector.

23. The method of claim 22, further comprising:
   prior to mating of the first and second connectors, aligning a first key member of the first connector with a second key member of the second connector such that the first and second key members mate with each other upon mating of the first and second connectors.

24. The method of claim 22, wherein the first connector connects with an electronic unit and the second connector connects with a communication device, and the method further comprises:
   after mating of the first connector with the second connector, transmitting at least one of analog signals, digital signals and electrical power between the communication device and the electronic unit.

25. The method of claim 22, wherein the base and sheath of the first connector are not movable with respect to each other.

26. The method of claim 22, wherein the sheath and the base plate of the first connector are formed as a single, integral unit.

* * * * *